Figure 1:
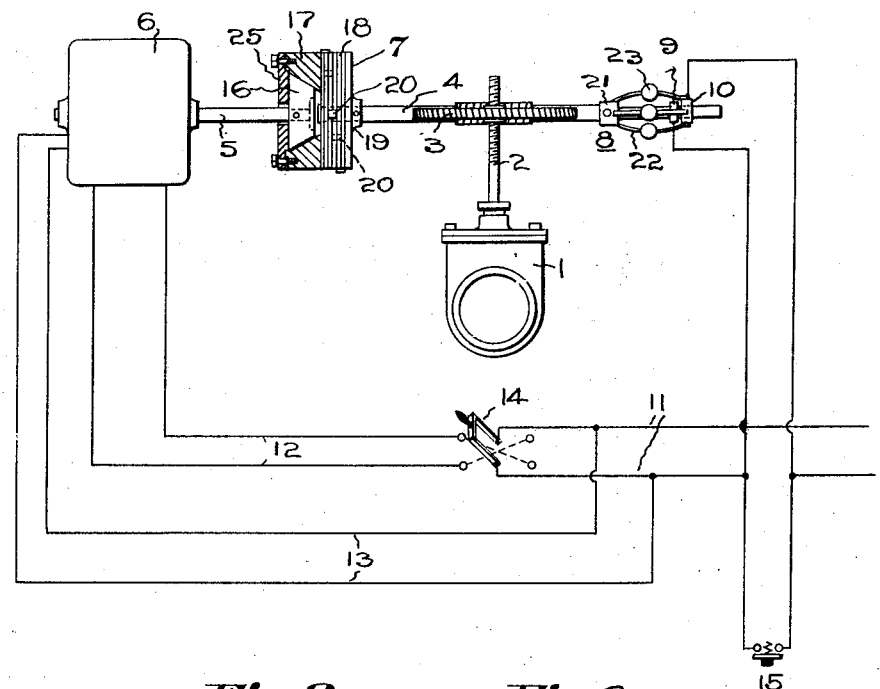

Aug. 25, 1931.  A. S. WISE  1,820,686
VALVE OPERATING MECHANISM
Filed June 2, 1924

WITNESSES:
R. S. Harrison
A. J. Fitzgerald

INVENTOR
Allen S. Wise
BY
Wesley S. Carr
ATTORNEY

Patented Aug. 25, 1931

1,820,686

UNITED STATES PATENT OFFICE

ALLEN S. WISE, OF PITTSBURGH, PENNSYLVANIA, ASSIGNOR TO WESTINGHOUSE ELECTRIC & MANUFACTURING COMPANY, A CORPORATION OF PENNSYLVANIA

VALVE OPERATING MECHANISM

Application filed June 2, 1924. Serial No. 717,301.

My invention relates to valve-operating mechanism, more particularly to electric drive mechanisms for opening and closing gate valves and the like without resultant injury to the electrical apparatus.

It is among the objects of my invention to provide an electric drive mechanism for operating valves which shall be of simple construction and which shall comprise a minimum number of parts so related and arranged as to prevent breakage or destruction of the drive elements.

It is a further object of my invention to provide a valve-operating mechanism which shall permit relative movement between the driving and driven members, whereby when the valve member becomes seated in the closing operation, destructive shock or impact will not be transmitted to the driving motor; and when the operation is reversed for opening the valve, the motor will be permitted to acquire sufficient speed to overcome the initial resistance that is offered in unseating the valve.

It is still a further object of my invention to provide an electric valve-operating mechanism which shall embody automatic means for de-energizing the motor when the driven element has reached the limit of its travel.

My invention comprises an electric motor constituting a driving element, a valve-operating mechanism constituting the driven element, a combined friction clutch and lost-motion mechanism for connecting the driving and the driven elements to permit slippage and angular displacement of the connected members and a centrifugal switch element that is physically connected to the valve-operating mechanism and electrically connected to the motor circuit.

The relation of these elements is such that the motor is initially and momentarily energized by a manually operated switch and will drive the valve mechanism through the clutch member for opening and closing the valve, while the centrifugal switch will close and maintain the circuit of the motor when the driven shaft has started rotation. The centrifugal switch will open instantly when the driven shaft comes to rest upon the seating of the valve, or when other travel-limiting mechanism becomes operative. Under such circumstances, momentary slippage occurs between the driving motor and the driven shaft by virtue of the connecting friction clutch.

Figure 2:
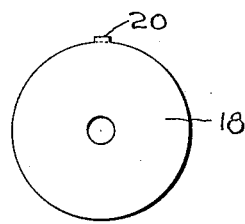
Figure 3:
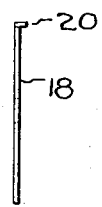

In the accompanying drawings constituting a part hereof and in which like reference characters designate like parts:

Figure 1 is a schematic view of an electrically operated valve mechanism embodying the principles of my invention, showing the several co-operating parts and the electrical circuit connecting the same, and Figs. 2 and 3 are respectively views in side and in end elevation, of the clutch disks that are utilized in the clutch member of Fig. 1.

Referring to Fig. 1, the system therein illustrated comprises a gate valve 1 having a valve stem 2 extending vertically thereof, which is coupled by a worm gear-wheel 3 to a worm shaft 4. The shaft 4 is in coaxial alinement with the armature shaft 5 of a motor 6 and is coupled thereto by a cone clutch and lost-motion mechanism 7.

A centrifugal switch 8 is secured to the extended end of the worm shaft 4 and comprises stationary and movable electrical contact members 9 and 10, respectively, which are electrically connected in one conductor of a supply circuit 11. A circuit 12 is connected to the field winding of the motor, and a circuit 13 to the armature thereof. A double-pole, double-throw reversing switch 14 is provided for effecting forward and reverse operation of the motor to thereby open and close the valve 1. A manually operated starting switch 15 is connected in shunt to the centrifugal switch 8 and serves to close the motor circuits until the centrifugally operated switch closes through rotation of the driven shaft 4.

The cone clutch mechanism 7 comprises a friction cone 16, which is mounted on the armature shaft 5, a friction ring 17 for engaging the cone 16 and a clamping plate 25 that is mounted upon the ring 17. A plurality of disks 18 for providing a lost-motion driving connection between the friction ring 17 and the hub 19 are mounted on the driven shaft 4. The disks 18 are severally provided with lateral projections 20 (see Figs. 2 and 3), which are adapted to engage each other successively, so that a delayed turning moment is delivered by the clutch member to the shaft through the successive joining of the respective disks by their projections whenever the mechanism is actuated. The clutch mechanism permits slippage between the motor and the driven element at a predetermined torque, which is approximately the maximum torque that the motor can safely deliver at any speed.

The centrifugal switch 8 comprises a fixed hub member 21, which is secured to the worm shaft 4 and is coupled by spring bands 22 to the contact member 10, which is movable along the shaft axis. A plurality of governor balls 23 are secured to the spring members 22 so that the centrifugal force of the balls will effect axial movement of the contact member 10 relative to the stationary contact member 9 to engage the latter.

The operation of this device is briefly as follows: Assuming the valve stem 2 to be in an "open" position and that it is desired to close the same, the operator throws the field switch 14 to one closed position and momentarily closes the switch 15, thus completing the circuit of the motor to the line. The motor is energized and rotates the cone clutch 17, which causes a successive engagement of the clutch disks 18 until they are all engaged. The worm shaft 4 is thereupon actuated to close the centrifugal switch 8 and operate the worm gear 3 which, by virtue of its screw-thread engagement with the valve stem 2, effects a lowering of the stem until the valve is seated in its closed position. At the instant of seating, the worm shaft 4 becomes stationary and the centrifugal switch 8 breaks contact, thus opening the motor circuit. The clutch mechanism 7 permits momentary slippage of the motor so that no severe shock or impact will be transmitted to the armature windings upon the seating of the valve. Moreover, the opening of the centrifugal switch 8 simultaneously with the seating of the valve de-energizes the motor, which quickly comes to a stop by virtue of the frictional resistance of the clutch 7.

To open the valve, the field-circuit switch 14 is thrown to its opposite or reversing position and the switch 15 is momentarily closed to effect operation of the motor 6 in the opposite direction of rotation. The lost-motion mechanism 7 permits several revolutions of the motor until all of the disk lugs 20 become re-engaged when the motor will produce a torsional blow on the worm shaft, 4, thus unseating the valve. When the valve is entirely opened, the stem 2 is again jammed, thus causing the worm shaft 4 to stop and open the centrifugal switch, which again breaks the motor circuit.

It is evident from the foregoing description of my invention that electrically-operated valve mechanism made in accordance therewith provides simple and efficient means for opening and closing valves, and that my device is especially adapted to the operation of relatively large valves, such as the gate valve illustrated in Fig. 1 of the drawings.

Although I have described a specific embodiment of my invention, it will be obvious to those skilled in the art that modifications and changes may be made in the details of construction as, for instance, in the type of centrifugal switch mechanism utilized and the design and proportion of the several co-operating parts, without departing from the principles herein set forth.

I claim as my invention:

1. A valve-operating mechanism comprising a valve, a gear-wheel secured to the valve stem thereof, a drive shaft cooperatively engaged with said wheel, a motor coupled to said drive shaft and having its armature shaft in coaxial alinement therewith, a friction clutch including a delayed motion device which acts independently of the direction of rotation for connecting said motor and drive shaft, a centrifugal switch mounted on said drive shaft, an electrical circuit for connecting said switch and the motor windings, means for energizing said motor to operate said mechanism, and means operative to automatically de-energize said motor.

2. In a valve-operating mechanism, the combination with a valve, having a valve stem, of a motor for operating the valve stem, a lost motion mechanism interposed between the motor and the valve stem for imparting a torque impulse to the valve stem in either direction, a frictional coupling between the motor and the lost motion mechanism for limiting the total torque exerted by the motor at all times and a centrifugal switch associated with the valve stem for stopping the motor when the coupling slips by reason of the valve stem reaching its limiting position.

3. A valve-operating mechanism comprising a shaft for operating a valve, a lost motion mechanism connected to the shaft, a motor for actuating the shaft by means of the lost motion mechanism, a frictional torque limiting coupling connected between the motor and the lost motion mechanism and operative at all times and a centrifugal switch for controlling the motor, operatively connected to the valve operating shaft in such manner that the switch will be opened to stop the motor when the shaft becomes stationary.

4. In a valve-operating mechanism, the combination with a valve having a valve stem, of a motor for actuating the valve stem, a switch for starting the motor, a lost motion mechanism between the motor and the valve stem for permitting the motor to start without load and for delivering a torque impulse to the valve stem in either direction of its travel to overcome the initial resistance thereof, a frictional coupling for permitting the motor to turn after the valve stem has reached its limiting position in either direction and a centrifugal switch associated with the valve stem for stopping the motor after the valve stem has stopped.

5. A valve-operating mechanism comprising a motor for operating a valve stem, an electrical circuit for the motor, reversing means for the electrical circuit for reversing the direction of rotation of the motor, a manually operated switch for closing the circuit to start the motor, a lost motion mechanism associated with the motor for imparting a blow to start the valve stem in either direction, a second switch in parallel circuit relation with the first named switch and associated with the valve stem, said second switch being disposed to remain closed only while the valve stem is moving and a friction coupling interposed between the motor and the valve and effective at all times to permit the motor to turn after the valve stem has come to rest.

In testimony whereof, I have hereunto subscribed my name this 20th day of May, 1924.

ALLEN S. WISE.